350-96.1 SR
XR 3,781,800
SEARCH ROOM

United Sta [11] 3,781,800
Cramer et al. [45] Dec. 25, 1973

SUBSTITUTE FOR MISSING XR

[54] DEVICE FOR CHARACTER RECOGNITION

[75] Inventors: Bernhard Cramer, Pforzheim; Herbert Domig, Niefern; Theodor Von Keller, Rutesheim; Rudolf Schmeykal, Pforzheim, all of Germany

[73] Assignee: International Standard Electric Corporation, New York, N.Y.

[22] Filed: June 20, 1972

[21] Appl. No.: 264,667

[30] Foreign Application Priority Data

July 19, 1971 Germany .................... P 21 36 044.1

[52] U.S. Cl....... 340/146.3 F, 250/227, 235/61.11 F
[51] Int. Cl. ............................................ G06k 9/00
[58] Field of Search .............. 340/146.3 F, 146.3 H; 250/227, 219 D; 235/61.11 F

[56] References Cited

UNITED STATES PATENTS

| | | | |
|---|---|---|---|
| 3,571,796 | 3/1971 | Brugger | 250/227 |
| 2,222,937 | 11/1940 | Dimmick | 340/146.3 F |

*Primary Examiner*—Thomas A. Robinson
*Attorney*—C. Cornell Remsen et al.

[57] ABSTRACT

A transparent polygonal disk with parallel side surfaces has an axis of rotation which is parallel to the record medium. The recognition logic is provided by glass fibers which are positioned on the side of the disk from which the light emerges. Each character element of the image contains a plurality of fibers.

3 Claims, 4 Drawing Figures

DEVICE FOR CHARACTER RECOGNITION

BACKGROUND OF THE INVENTION

The present invention relates to a device for character recognition with fully parallel scanning and mechanical-optical centering in which the recording medium is moved continuously, an image of the character to be recognized being moved, by means of rotating optical means and vertically to the direction of movement of the recording medium, over an image area in which lies one end of a glass-fiber bunch. A part of the recognition logic is realized by combining the other ends of the fibers of the glass-fiber bunch, the combined fibers acting upon a photocell and the outputs of all photocells being connected to a maximum detecting circuit, by means of which the character is recognized at the instant of correct centering.

Such a device, in which a mirror is used as the rotating optical means and in which two systems of light pipes are arranged in series, is known from the U.S. Pat. No. 3,225,329.

A similar device, in which only one light-conductive system, i.e. one glass-fiber bunch, is used, is known from the German published application No. 2,012,677. This known device, however, permits only very poor utilization of the light falling on the image plane because the ends of the light pipes are inserted in a plate. Those portions of the plate area which contain no holes, i.e. no glass fibers, are not utilized, the efficiency thereby being adversely affected.

The conventional devices necessitate an enlargement of the picture because a photodiode is larger than an image element. In addition to the rotating mirror, deflecting means are necessary which deflect the reflected image from the plane of the recording medium. These two disadvantages prevent any compact construction of the scanning device.

In the journal "Hasler-Mitteilungen" 1964, No. 2, pp. 64 to 71, a reader is described which scans the characters point by point and uses a prism as the mechanical-optical means. This reader requires an electronic storage for receiving the individual image points, and centering must then be accomplished by shifting the storage contents.

SUMMARY OF THE INVENTION

It is an object of the present invention to provide a character recognition device with a recognition circuit which is small, inexpensive to make and practically maintenance-free, and which avoids the disadvantages of the known devices.

The invention is characterized in that said rotating optical means is a transparent polygonal disk with parallel side surfaces whose axis of rotation is parallel to the direction of movement of the recording medium, that the image area is disposed, parallel to the recording medium, on that side of the polygonal disk on which the light emerges and on a level with the character to be recognized, that the entire image area consists of said one ends of the glass fibers used for logic operation, and that each character element of the image area contains a plurality of fibers.

BRIEF DESCRIPTION OF THE DRAWINGS

The invention will now be explained in more detail by way of example and with reference to the accompanying drawings, in which.

DESCRIPTION OF THE PREFERRED EMBODIMENT

Figure 1:
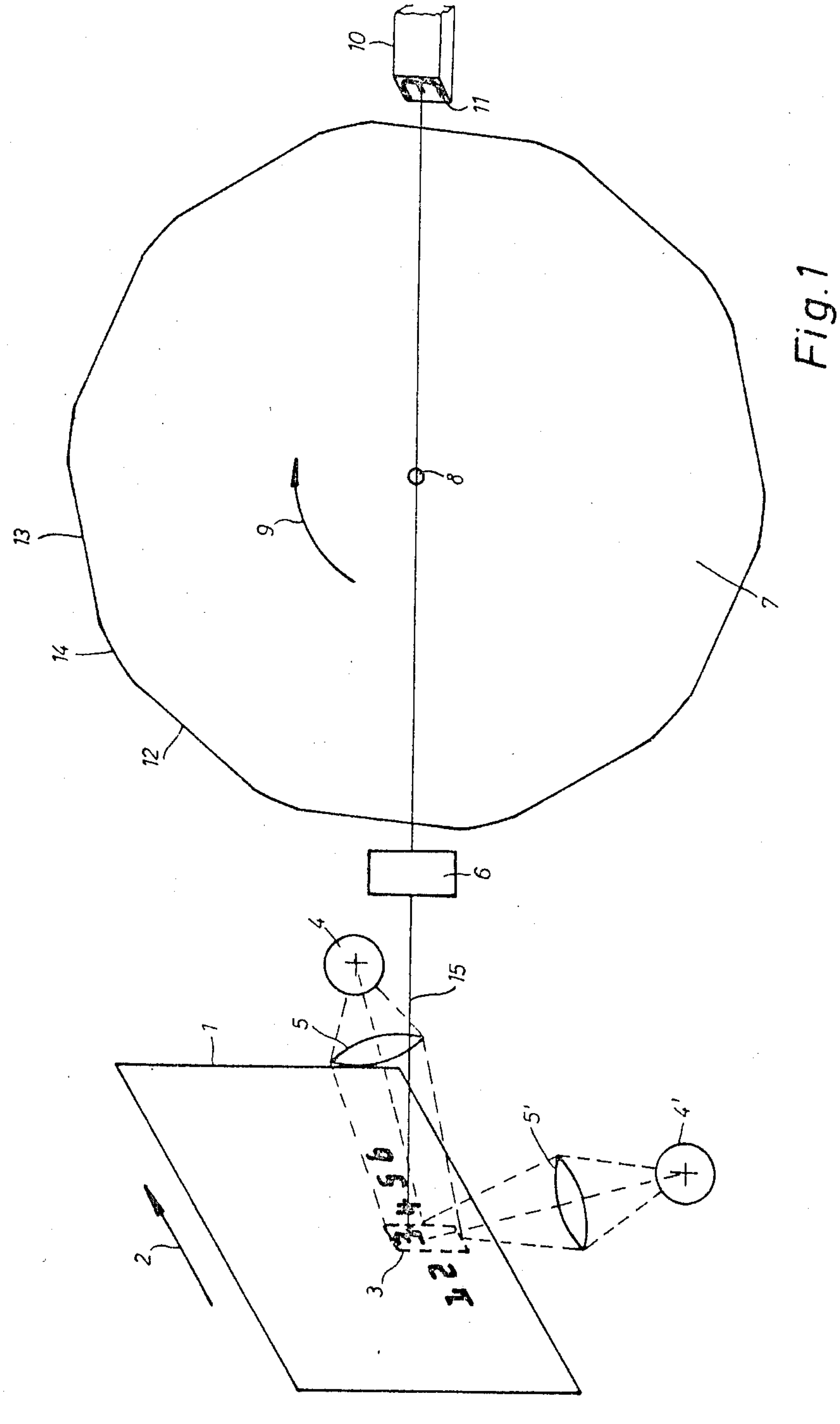
FIG. 1 shows the scanning device.

Referring to FIG. 1, there is shown a recording medium 1 on which standardized stylized numerals, e.g. in OCR-A type, are printed in one line. The recording medium 1 moves continuously in the direction of arrow 2. A character field 3, bordered by a broken line and having the dimensions of e.g. one character width and three character heights, is evenly illuminated by two light sources 4, 4′ via lenses 5, 5′.

The character field is pictured in the plane of an image field 11 via an objective 6 and a transparent polygonal disk 7. The polygonal disk 7, whose axis is designated 8, rotates constantly in the direction of arrow 9. The base surface and the top surface of the polygonal disk are congruent regular decagons, and, consequently, two side surfaces lying opposite each other are parallel. In the drawing, two plane side surfaces of the polygonal disk, e.g. 12 and 13, do not border on each other directly, but curved interfaces 14 are between each of them, which are blackened. From these blackened interfaces, the clock signal for the recognition circuit can be derived. If, however, other means are provided for producing the clock pulses, the curved interfaces are omitted, so that the plane side surfaces border on each other directly.

The polygonal disk is cast of polymethyl methacrylate or a similarly transparent plastic material. This manufacturing method is simple because no reworking of the optically effective surfaces 12, 13, e.g. by grinding, is necessary.

Located at the place of the image area 11 is one end of a glass-fiber bunch 10, which will be explained in connection with FIGS. 2 and 3.

In FIG. 1, the beam path is illustrated in a simplified manner, only one centric light beam 15 from the center of the just scanned numeral "3" being shown. During the rotation of the polygonal disk 7, this beam, or the image of the character, moves over the image area 11 from high to low. Since the polygonal disk with the two respective side surfaces lying in the beam path behaves like a plane-parallel plate, in which, as is well-known, the angle of incidence is equal to the angle of emergence, practically all light beams fall on the image area vertically. The speed of the disk 7 is e.g. 27,000 revolutions per minute, and the read rate is e.g. 300 characters per second, so that, taking into account the number of surfaces of the polygonal disk, about 15 scans per character (including spacing) are obtained.

Figure 2:
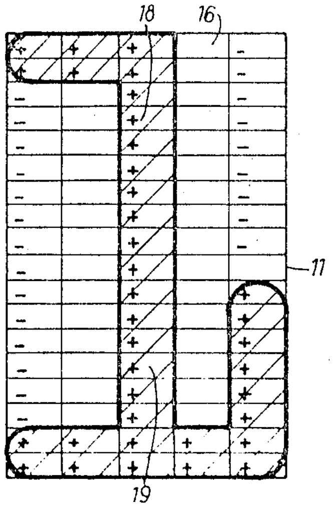
FIG. 2 shows the division of the bunch of light pipes at the image end into image elements.

FIG. 2 shows the image area 11, i.e. one end of the bunch of light pipes. It can be seen that the image area is divided into five columns and eighteen rows, i.e. into ninety image elements.

Figure 3:
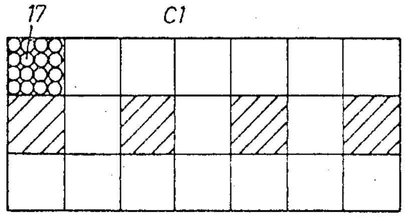
FIG. 3 shows the division of an image element into fields.

One image element 16 is illustrated in FIG. 3. It is divided into 21 fields, arranged in seven columns and three rows. A single field 17 contains sixteen individual light pipes, whose ends are delineated. For the further description, the light pipes of one field can be regarded as one light pipe composed of several light pipes. The field 17 and the white fields serve to recognize the characters, while the hatched fields serve to determine the total blackening.

Figure 4:
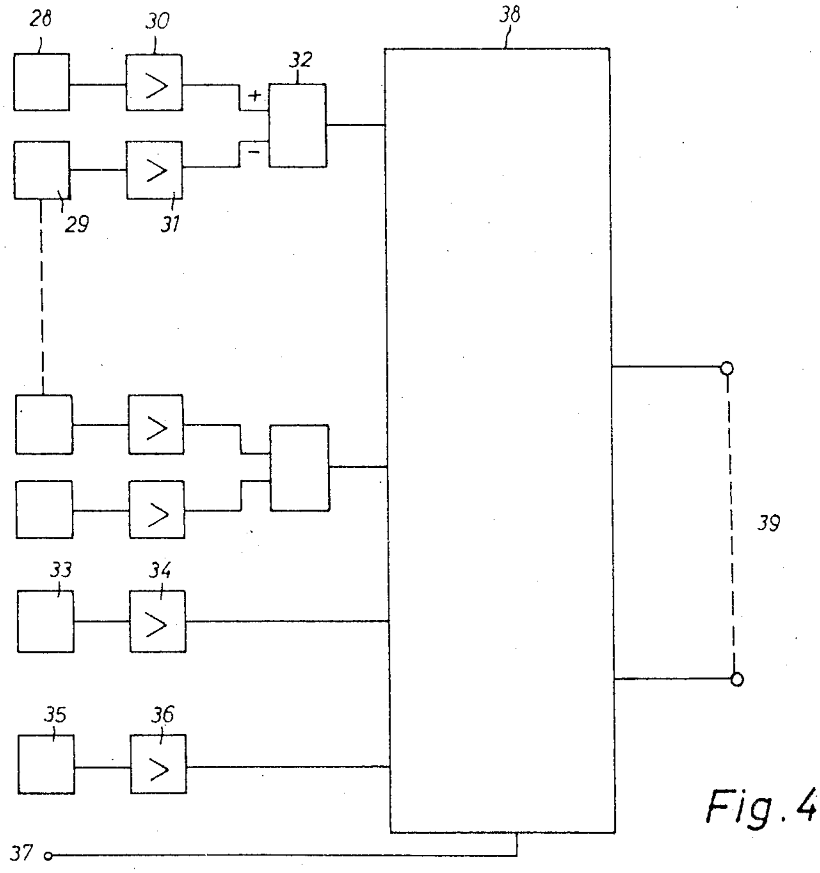
FIG. 4 shows the combination of the fields at the other end of the bunch of light pipes as well as the recognition circuit.

FIG. 2, in connection with FIG. 4, shows how the light pipes of the individual fields of the image elements are combined at the other end of the bunch of light pipes. In FIG. 2, the numeral "1" of the OCR-A set of numerals is drawn in the image area. All elements covered by the numeral are marked +, and the elements which must not be covered at the numeral "1" are marked −. The light pipes of at least one field of each image element marked + are combined at the other end of the bunch of light pipes and act upon a photocell 28 (FIG. 4). The same applies analogously to the elements marked −; they, however, act upon another photocell 29. The number of fields of one element for a certain character determines the weight of the element for that character.

For all other numerals to be recognized, too, the light pipes of one or more fields of the elements to be weighted positively and of those to be weighted negatively are led to separate photocells. In these photocells 28, 29, the signals from the fields are summed. The photocells are followed by adjustable amplifiers 30, 31, whose adjustments determines the weight of the positive and the negative sums. The outputs of the amplifiers are connected to differential amplifiers 32.

The light pipes of one or more fields of each element (hatched in FIG. 3) are led to a further photocell 33, which is followed by an amplifier 34. The thus obtained signals serves to determine the total blackening. If the latter exceeds a predetermined value, character recognition can take place.

In the middle column of FIG. 2, two elements are designated 18 and 19. The light pipes of at least one field of these two elements act upon a photocell 35, which is followed by an amplifier 36. The output signal of this amplifier serves to recognize the spacing between the characters. The white level occurring at this instant is stored, too, and, for the purpose of determining the contrast, compared with the black level occurring as the character is moved on, so that the contrast is known at the instant of character recognition.

Applied to the terminal 37 (FIG. 4) is a clock signal derived from the polygonal disk or its drive. This clock signal releases a recognition circuit 38 only at those instants at which the character is moved over the image plane, and blocks it if the image falls on an edge between two side surfaces. The recognition circuit 38 processes the signals at the outputs of the amplifiers 32, 34 and 36. The total blackening signal and the contrast signal are used for normalization; the clock signal, the interspace signal and the total blackening signal are used for synchronization. At its outputs 39, the recognition circuit supplies a code for the recognized character or a "not-recognized" signal.

Recognition is essentially performed with a maximum detecting circuit whose threshold is changed by contrast and total blackening when the total blackening exceeds a predetermined value. The recognition circuit itself was only indicated; it forms no part of the invention.

Although we have described above the principles of our invention in connection with specific apparatus, it is to be clearly understood that this description is made only by way of example and not as a limitation to the scope of our invention as set forth in the objects thereof and in the accompanying claims.

What is claimed is:

1. An improved device for character recognition with fully parallel scanning and mechanical-optical centering in which the recording medium is moved continuously, an image of the character to be recognized being moved, by means of rotating optical means and vertically to the direction of movement of the recording medium, over an image area in which lies one end of a glass-fiber bunch, and in which part of the recognition logic is realized by combining the other ends of the fibers of the glass-fiber bunch, the combined fibers acting upon a photocell and the outputs of all photocells being connected to a maximum detecting circuit, by means of which the character is recognized at the instant of correct centering, the improvement comprising in combination:

said rotating optical means is a transparent polygonal disk with parallel side surfaces whose axis of rotation is parallel to the direction of movement of the recording medium, said image area is disposed, parallel to the recording medium, on that side of the polygonal disk on which the light emerges and on a level with the character to be recognized, and the entire image area consists of said one ends of the glass fibers used for logic operation, with each character element of the image area containing a plurality of fibers.

2. A device according to claim 1 wherein each fiber consists of a number of paralleled individual fibers.

3. A device according to claim 2 wherein said polygonal disk is made of polymethyl methacrylate or the like.

* * * * *